Oct. 18, 1938.  S. STERLING  2,133,589
GRAPH FOR LOCATING THE OPTICAL CENTER OF A MULTIFOCAL LENS
Filed April 24, 1937
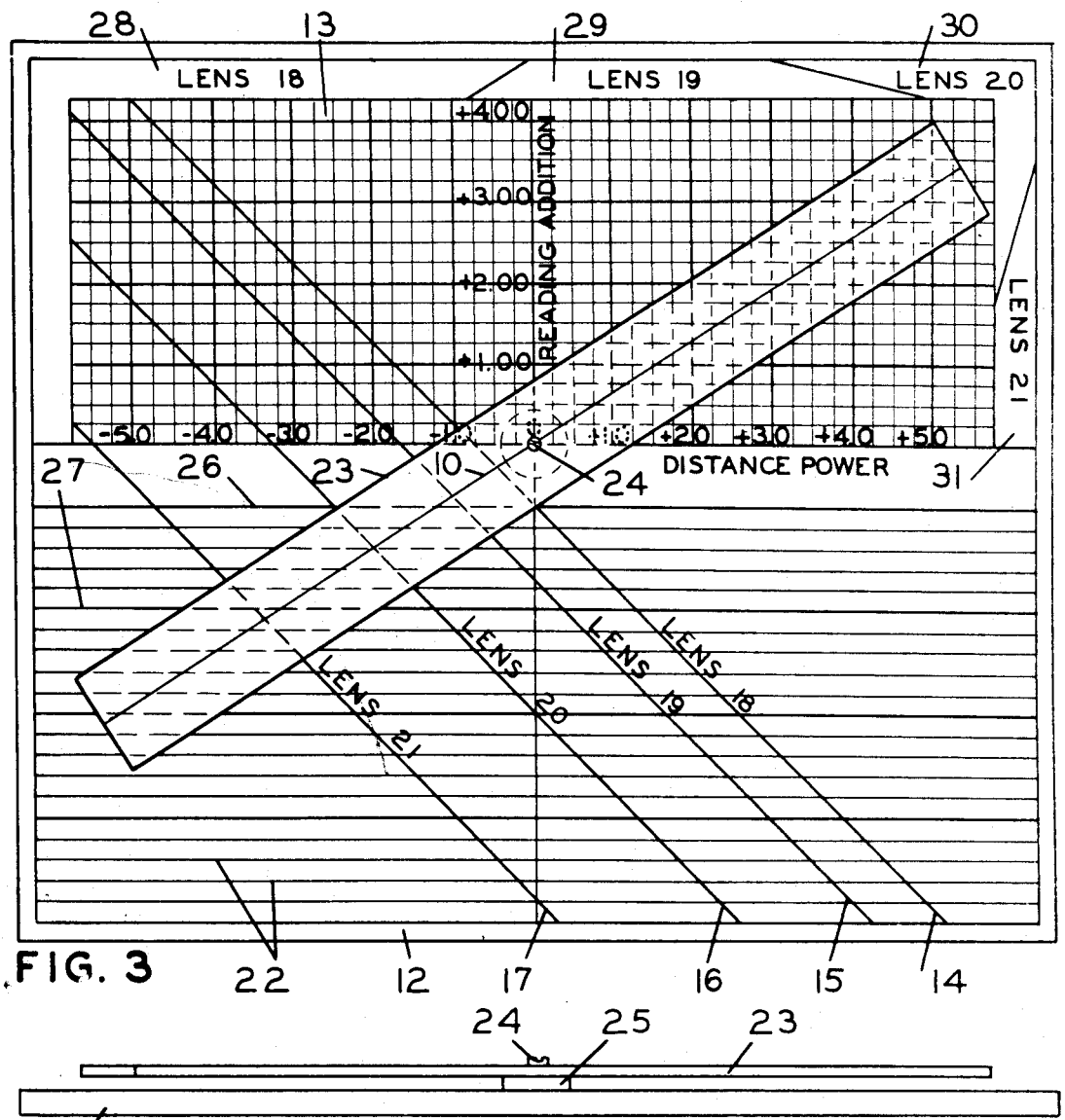
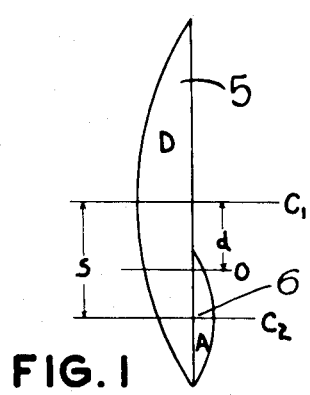
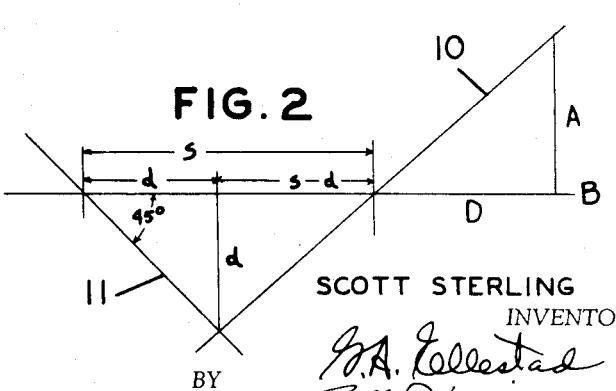
SCOTT STERLING
INVENTOR.
BY
ATTORNEYS Patented Oct. 18, 1938

2,133,589

UNITED STATES PATENT OFFICE 2,133,589

GRAPH FOR LOCATING THE OPTICAL CENTER OF A MULTIFOCAL LENS

Scott Sterling, Rochester, N. Y., assignor to Bausch & Lomb Optical Company, Rochester, N. Y., a corporation of New York Application April 24, 1937, Serial No. 138,808

4 Claims. (Cl. 235—89)

The present invention relates to a graph for determining the location of the optical axis of a multifocal lens in any given prescription.

One of the objects of the present invention is to provide a device for graphically determining a type of bifocal lens properly suited to a given prescription. Another object is to provide a device for graphically determining the location of the optical center of that portion of the multifocal lens used for reading or other near seeing task. These and other objects and advantages reside in certain novel features of construction, arrangement and combination of parts as will hereinafter be more fully set forth and pointed out in the appended claims.

Referring to the drawing:

Fig. 1 is a side elevation of a bifocal lens.

Fig. 2 is a diagrammatic view showing the construction of the graph.

Fig. 3 is a plan view of a preferred form of graph.

Fig. 4 is a front elevation thereof.

The bifocal lens shown in Fig. 1 has a distance portion 5 having a power D, measured in diopters and a segment or reading addition 6 having a power A, measured in diopters. The central axis $C_1$ of the distance portion 5 is spaced from the central axis $C_2$ of the reading addition 6 by a distance S measured in millimeters. This distance S is determined by the maker of the lens and is different for each different type of lens represented on the graph. The resultant optical center 0 of the combined distance portion 5 and reading addition 6 is the point at which the prism component of the addition 6 exactly neutralizes the prism component of the distance portion 5. The distance between the optical center 0 and the central axis $C_1$ of the distance portion 5 is designated by the character d measured in millimeters.

The prism component of the distance portion at the optical center 0 is thus $Dd$ and the prism component of the reading addition at that point is $A(s-d)$. Therefore, $$Dd = A(s-d)$$

Dividing both sides by $Ad$ $$\frac{Dd}{Ad} = \frac{A(s-d)}{Ad}$$

the equation becomes $$\frac{D}{A} = \frac{(s-d)}{d} \text{ or } \frac{A}{D} = \frac{d}{(s-d)}$$

The same equations apply equally well to trifocal and other multifocal lenses and the theory of the graph is explained with reference to a bifocal lens only because of the greater simplicity of a bifocal lens. In the case of a trifocal or other multifocal lens, the equations would be applied to each segment portion individually.

As indicated in Fig. 2, the distance power D is plotted along the abscissa and the addition power A is plotted along the ordinate. A fiducial line 10 passes through the origin and the point AD and extends downward to intersect a line 11 which is drawn at an angle of 45 degrees with the abscissa and which intersects the zero abscissa at a distance from the origin proportional to the distance S. A perpendicular from the point of intersection of lines 10 and 11 to the base line B divides the abscissa between the origin and the line 11 into distances proportional to $d$ and $(s-d)$. Since the line 11 makes an angle of 45 degrees with the abscissa, the length of the perpendicular is also proportional to $d$.

The purpose of the graph of the present invention is to determine the distance $d$ for lenses of different combinations of powers and different types and to determine which type of lens has the optical axis at the desired position. This is attained when the resultant optical center of the reading area lies between the top of the reading addition or segment A and the average reading level, which is about eight millimeters below the central axis $C_1$ of the distance portion D.

Figs. 3 and 4 illustrate a mechanical embodiment of the present invention. A support 12 is provided on one surface with a graph 13 graduated so that the ordinates denote the power of the addition or segment A and the abscissae denote the power of the distance portion D. Negative segment powers would, of course, be measured downward but since they are at present of little commercial importance, they are not indicated on the graph. The lines 14, 15, 16 and 17 designate four types of lens having distances S between the central axis $C_1$ of the distance portion D and the central axis $C_2$ of the addition or segment A, of 3, 6½, 13 and 22 millimeters, respectively. The types of lens so made are indicated on the drawing as lens 18, lens 19, lens 20 and lens 21, respectively. Lenses having distances S different from these values, would, of course, be represented by other lines appropriately positioned on the graph.

The preferred embodiment of the invention is primarily designed for use with lenses in which the top of the segment or addition is 3 millimeters below the central axis $C_1$ of the distance portion D. Below the graph 13, the support 12 is provided with a plurality of equally spaced lines 22 parallel to the abscissae of the graph 13. These lines 22 are spaced so as to indicate in millimeters, the distance between the top of the segment or addition A and the optical center 0. As stated above, the top of the segment or addition A is 3 millimeters below the central axis $C_1$ of the distance portion D, and hence there are three spaces between the zero abscissa and the top horizontal line.

A transparent member 23 is rotatably mounted upon a screw 24 for pivotal movement about the origin of the graph and is held in spaced relation to the graph by a washer 25. The member 23 carries the fiducial line 10 which intersects the pivotal axis of the member 23.

In use, the member 23 is rotated until the fiducial line 10 is over the point representing the particular combination of distance power and addition called for in the lens prescription. The preferred type of lens for this prescription is the lens whose line intersects the fiducial line 10 between the top horizontal line 26 below the graph 13 and the horizontal line 27 denoting the average reading level. For example, if a prescription calls for a bifocal lens having a distance power of 3½ diopters and a reading addition of 2¼ diopters, the member 23 would be moved until the fiducial line 10 occupies the position shown in Fig. 3. In this position, the only lens type line shown on the graph which intersects the fiducial line between the line designating the top of the segment and the line designating the average reading level, is the line 16. This means that for the desired performance, the required lens is one in which the central axis $C_2$ of the addition A is located 13 millimeters below the central axis $C_1$ of the distance portion D.

For a ready determination of the lens type, the graph is provided with a border marked off into areas 28, 29, 30 and 31 corresponding to the lens type lines 14, 15, 16 and 17. These areas are preferably of different colors and the lens type is marked in the area as shown in Fig. 3. Thus, the desired type of lens is directly indicated as well as the location of the optical center 0.

Although the illustrated embodiment is designed for use with lenses in which the distance between the top of the segment and the central axis $C_1$ is 3 millimeters, this distance is largely a matter of choice and the graph can be made for any desired distance. The spacing between the line 26 and the zero abscissa is always made equal to the distance between the top of the segment and the central axis $C_1$. The graph can readily be made universal by placing the line 26 and the lines 14, 15, 16 and 17 on a transparent member which is slidable in the direction of the ordinates and which is held against rotation. In this way, the graph can be set for different distances between the top of the segment and the central axis $C_1$ and then operated in the usual manner to determine the position of the optical center.

From the foregoing it will be apparent that I am able to attain the objects of my invention and provide a device for graphically determining the desired type of bifocal lens for a given combination of reading power and addition. Various modifications can, of course, be made without departing from the spirit of my invention or the scope of the appended claims.

I claim:

1. A device for graphically determining the position of the optical axis of a multifocal lens comprising a rectilinear graph on which the abscissae indicate distance powers and the ordinates indicate the additional powers of the reading portions, a fiducial line rotatably mounted at the origin of said graph, a line crossing the zero abscissa at 45 degrees at a distance from the origin which is proportional to the separation between the center lines of the distance portion and the reading portion, and means for indicating the distance between the zero abscissa and the point of intersection of the fiducial line and the 45 degree line.

2. A device for graphically determining the position of the optical axis of a multifocal lens comprising a rectilinear graph on which the abscissae indicate distance powers and the ordinates indicate the additional powers of the reading portions, a fiducial line rotatably mounted at the origin of said graph, a line crossing the zero abscissa at 45 degrees at a distance from the origin which is proportional to the separation between the center lines of the distance portion and reading portion, means for indicating the distance between the zero abscissa and the point of intersection of the fiducial line and the 45 degree line, and means for determining when this intersection falls within predetermined limits.

3. A device for graphically determining the type of bifocal lens desired for a given combination of distance power and reading addition comprising a rectilinear graph on which the abscissae indicate distance power and the ordinates indicate reading addition power, a fiducial line rotatably mounted at the origin of said graph, means for adjusting said fiducial line to the given combination of powers on the graph, means for indicating the position of the optical axis of various types of lens for the given combination of powers, and means for indicating the desired location for the optical axis.

4. A device for graphically determining the type of bifocal lens desired for a given prescription comprising a rectilinear graph on which the abscissae indicate distance powers and the ordinates indicate reading powers, a fiducial line rotatably mounted on said graph with its axis at the origin, a plurality of parallel lines on said graph making an angle of 45 degrees with the abscissae, said lines crossing the zero abscissa at distances proportional to the distances between the geometric centers of the reading portion and segment of various types of bifocal lens, and means for indicating the position of the resultant optical center of the reading area.

SCOTT STERLING.